Figure 1:
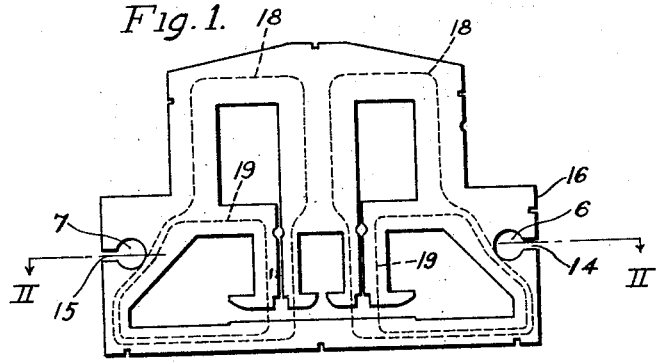

Sept. 11, 1928.　　　A. R. RUTTER　　　1,684,149

WATTHOUR METER

Filed Nov. 19, 1926

WITNESSES:

INVENTOR
Argyle R. Rutter.
BY
ATTORNEY

Patented Sept. 11, 1928.

1,684,149

UNITED STATES PATENT OFFICE.

ARGYLE R. RUTTER, OF FOREST HILLS, PENNSYLVANIA, ASSIGNOR TO WESTINGHOUSE ELECTRIC & MANUFACTURING COMPANY, A CORPORATION OF PENNSYLVANIA.

WATTHOUR METER.

Application filed November 19, 1926. Serial No. 149,319.

My invention relates to electrical measuring instruments and particularly to watthour meters of the induction type.

My invention has for an object to provide an induction meter that will operate correctly at light loads.

Another object of my invention is to provide means for avoiding short-circuit currents in the framework of an induction meter.

A further object of my invention is to provide an induction meter that shall be effective in operation, cheap to manufacture and simple in construction.

Induction meters, having metal covers secured by rods that pass through the laminated electromagnetic core to thereby fasten the same to the base, operate inaccurately at light loads. The cause of such inaccuracy arises by virtue of the fact that a current path, formed by the series-circuit relation of the structural members, is circumscribed by a flux path in a material of high permeability through which the alternating flux passes that actuates the disc. A transformer action takes place between the closed current conducting path and the circumscribing alternating flux. Since the resistance of the current path is relatively low, a heavy current is induced therein, thereby decreasing the efficiency of the meter greatly at light loads. A loss of energy takes place at all loads but such loss of energy is particularly noticable at light loads.

In practicing my invention, I provide means for substantially obviating such inaccuracy at light loads by decreasing the permeability of the medium of the flux path surrounding the closed-current conducting path.

My invention will be better understood by reference to the accompanying drawings taken in connection with the following description.

Figure 2:
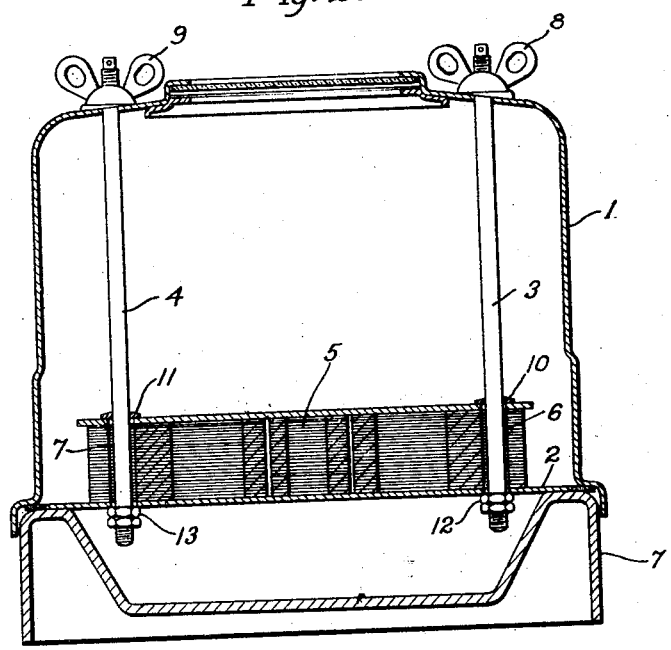

In the drawings,

Fig. 1 is an elevational view of a lamination of an electromagnetic core of an induction meter, and Fig. 2 is a view, partially in section and partially in elevation, of several elements of an induction meter.

In Fig. 2, a cover 1 is secured to a base plate 2 by rods 3 and 4. An electromagnetic core 5, consisting of a plurality of laminations, is provided with holes 6 and 7 through which the rods 3 and 4 extend. The rods support the electromagnetic core 5 in a relatively fixed position with respect to the cover 1 and the base plate 2.

The base plate 2 is mounted on a base 7 and suitably secured thereto.

The outer rends of the rods 3 and 4 are threaded to receive wing nuts 8 and 9, by means of which the cover 1 is firmly held in place against the base plate 2.

The rods 3 and 4 are provided with projections 10 and 11 that cooperate with nuts 12 and 13 to secure the core 5 to the plate 2.

The laminations of the core 5 are provided with slots 14 and 15 between the holes 6 and 7 and the periphery 16, as shown in Fig. 1.

In Fig. 1, the dotted lines 18 represent the path of the major portion of the flux emanating from the voltage element, and lines 19 represent the path of the major portion of the flux emanating from the current element.

In Fig. 2, it may be seen that a substantially closed-current circuit is established by the series-circuit relation of the rod 3, the cover 1 and the plate 2, and that a similar current circuit is established by the rod 4, the cover 1 and the plate 2. Heretofore, the flux paths 18 and 19 embraced that portion of the core about the holes, and the path of least reluctance through those portions transmitted the major part of the flux. The closed circuits, including the rods 3 and 4, respectively, were, therefore, energized by an alternating flux that induced currents in the closed circuits established by the rods, the cover and the base plate.

The slots 14 and 15 increase the reluctance of the flux paths around the outer sides of the rods 3 and 4 and thereby force the alternating flux to take the paths on the inside of the rods, as shown by the dotted lines in Fig. 1. The induction of currents in the closed-circuit paths are, in this manner, substantially obviated.

The obviation of such short-circuit currents increases the efficiency of the meter materially at light loads. Such uselessly expended energy influences the armature or disc of the meter, and is a determining factor in the accuracy of the meter at light loads.

A distinct advantage of my invention lies in the simplicity thereof. By merely removing a section of the electromagnetic core, the accuracy of the induction meter at light loads is greatly increased. The shape of the core laminations may be variously modified to obtain such advantageous operation without departing from the spirit and scope of my invention, as set forth in the appended claims.

I claim as my invention:

1. The combination with a group of magnetizable members and means for establishing a fluctuating magnetic field along a path included in said magnetizable members, of a closed-circuit electricity-conducting path inductively associated with said magnetizable members, and means for reducing the current induced by said magnetic field in said closed-circuit path to a negligible quantity.

2. In combination, a magnetizable core having a peripheral portion traversed by an alternating flux, a supporting structure for said core comprising a closed electric conducting path, an element of said structure passing through said peripheral portion in the path of said flux, and means including an air gap in said peripheral portion for decreasing the magnitude of the flux that induces current in the said structure.

3. An electrical measuring instrument comprising a magnetizable core having a peripheral portion traversed by an alternating flux, a supporting structure for said core including a closed electrical current conducting path linked by a portion of said flux, and means including a medium of high reluctance in the peripheral portion of said core for decreasing the magnitude of said linking flux.

4. In a meter, the combination with a base, a magnetizable core traversed by an alternating flux, a cover, and means comprising rods extending through said core for holding the base, core and cover in assembled relation, said rods, base and cover forming a closed electrical current conducting path, of means for decreasing the magnitude of the current induced in said path comprising an air gap in that portion of said core traversed by the flux inducing said current.

5. In a meter, the combination with a magnetizable core having an alternating flux therein, an electric current conducting path linked by a portion of said flux comprising a rod extending through said core, and a cover and a base held in assembled relation by said rod, of means for reducing the magnitude of said linking flux comprising a medium of high reluctance in the path of said linking flux.

6. In combination in a meter, a magnetizable core, means for producing an alternating flux in said core, and a current path comprising a cover and supporting structure, the alternating flux in said core linking said path, of means for reducing the magnitude of the current induced in said path by said flux.

7. In an electrical measuring instrument, the combination with a core traversed by an alternating flux, and a supporting structure for said core including a closed electric current path linked by said flux, of means for decreasing the current induced in said structure by said flux comprising a core opening in the path of said flux.

8. The method of decreasing induced currents in the cover and supporting members of an induction instrument having a laminated core traversed by an alternating flux, which comprises increasing the reluctance of the path traversed by said flux.

In testimony whereof, I have hereunto subscribed my name this 13th day of November, 1926.

ARGYLE R. RUTTER.